United States Patent [19]
Ravichandran

[11] Patent Number: 5,966,536
[45] Date of Patent: Oct. 12, 1999

[54] METHOD AND APPARATUS FOR GENERATING AN OPTIMIZED TARGET EXECUTABLE COMPUTER PROGRAM USING AN OPTIMIZED SOURCE EXECUTABLE

[75] Inventor: Hari K. Ravichandran, Sunnyvale, Calif.

[73] Assignee: Sun Microsystems, Inc., Palo Alto, Calif.

[21] Appl. No.: 08/864,247

[22] Filed: May 28, 1997

[51] Int. Cl.$^6$ ................................................ G06F 9/445
[52] U.S. Cl. ............................................................. 395/709
[58] Field of Search .................................... 395/500, 600, 395/709

[56] References Cited

U.S. PATENT DOCUMENTS

| | | | |
|---|---|---|---|
| 5,313,614 | 5/1994 | Goettelmann et al. | 395/500 |
| 5,347,654 | 9/1994 | Sabot et al. | 395/600 |
| 5,361,357 | 11/1994 | Kionka et al. | 395/700 |
| 5,493,675 | 2/1996 | Faiman, Jr. et al. | 395/709 |
| 5,524,253 | 6/1996 | Pham et al. | 395/800 |
| 5,551,015 | 8/1996 | Goettelmann et al. | 395/500 |
| 5,560,013 | 9/1996 | Scalzi et al. | 395/700 |
| 5,577,231 | 11/1996 | Scalzi et al. | 395/500 |
| 5,724,590 | 3/1998 | Goettelmann et al. | 395/707 |

OTHER PUBLICATIONS

H.A. Rizvi, et al.; "Execution–Driven Simulation of a Superscalar Processor"; IEEE; 1994; pp. 185–204.

Wayne Yamamoto, et al.; "Performance Estimation of Multistreamed, Superscalar Processors"; IEEE; 1994; pp. 195–204.

*Primary Examiner*—Robert W. Downs
*Assistant Examiner*—Chameli C. Das
*Attorney, Agent, or Firm*—Sierra Patent Group Ltd.

[57] ABSTRACT

A method and apparatus for transforming a source executable code optimized for a source processor into a target executable code optimized for execution on a target processor is provided. Initially, the source executable is converted into a functionally equivalent source executable capable of execution on the target processor. Next, execution performance information for each basic block of code in the functionally equivalent source executable code is collected. Similarly, execution performance information for each basic block of code in an initial target executable code is also collected. As a next step, an optimization metric is generated for each basic block of code within the functionally equivalent source executable code and for each basic block of code within the initial target executable code. These optimization metrics are used to compare basic blocks in the functionally equivalent source executable code with basic block of code within the initial target executable code. To perform this comparison, the optimization metric for each basic block of code within the initial target executable code is associated with the corresponding optimization metric associated with each basic block of code within the functionally equivalent source executable code. Next, based upon the corresponding optimization metric for each basic block, it is determined which basic blocks of code in the initial target executable code and the functionally equivalent source executable code have higher execution performance. Next, a target executable code is generated using a combination of basic blocks of code from the initial target executable code and the functionally equivalent source executable code which exhibit higher execution performance. Then, each basic block in the target executable code is optimized in a predetermined order typically based upon the elapsed execution time.

10 Claims, 3 Drawing Sheets

METHOD AND APPARATUS FOR GENERATING AN OPTIMIZED TARGET EXECUTABLE COMPUTER PROGRAM USING AN OPTIMIZED SOURCE EXECUTABLE

RELATED APPLICATIONS

This application is related to U.S. patent application Ser. No. 08/864,655 filed May 28, 1997, entitled "METHOD AND APPARATUS FOR DYNAMICALLY OPTIMIZING AN EXECUTABLE COMPUTER PROGRAM USING INPUT DATA", Attorney Docket No. 82225.P2017, and naming Hari Ravichandran as inventor, and U.S. patent application Ser. No. 08/865,335, filed May 28, 1997, entitled "METHOD AND APPARATUS FOR CONVERTING EXECUTABLE COMPUTER PROGRAMS IN A HETEROGENEOUS COMPUTING ENVIRONMENT", Attorney Docket No. 82225.P2132, also naming Hari Ravichandran as inventor both of which are assigned to the assignee of the present invention and are herein incorporated, in their entirety, by reference.

FIELD OF THE INVENTION

The present invention relates to computer compilers and interpreters, in particular, this invention relates to generating an optimized target executable computer program based upon an optimized source executable program.

BACKGROUND OF THE INVENTION

In an open computing environment, most software applications are usually available on a wide variety of computer hardware platforms. Often, software applications written using open computing standards such as C, C++ and JAVA can be ported to several different computer hardware platforms with very little effort. In fact, applications written entirely in JAVA require no actual porting and are categorized uniquely as "Write Once, Run Anywhere"[1] because they run on many platforms with little or no modification. Consequently, computer hardware manufacturers can no longer sell their computing platforms based on the availability of proprietary software applications because the software can be easily ported to many different computer hardware platforms. Instead, computer manufacturers must compete by offering computer hardware platforms with more processing power and increasingly lower costs.

1. Write Once, Run Anywhere is a trademark of Sun Microsystems, Inc. in the United States and other countries. Write ONCE, Run Anywhere est une marque de fabrique ou une marque déposée de Sun Microsystems, Inc. aux Etats-Unis et dans d'autres pays.

Benchmarks are typically used to measure the processing power of a computer hardware platform. Computer manufacturers work hard to improve the execution performance of benchmarks to bolster the performance ratings of their computer hardware platforms. The importance of these benchmarks is underscored by the amount of research and development spent on optimizing compilers. These optimizing compilers can increase the execution performance of a benchmark using special compilation techniques in the optimizer without even modifying the underlying hardware. In particular, benchmarks run through an optimizing compiler can execute faster on the same hardware platform by streamlining the executable code and reducing the total number of clock-cycles per instruction (CPI) required to execute the benchmark.

These benchmark applications are also very important because they often become the basis on which a user will ultimately select a computer hardware platform. In many cases, a better optimizing compiler can make an inherently less powerful computer hardware platform appear to have equal or more processing throughput than a computer hardware platform with more theoretical overall processing power. More specifically, computer manufacturers who develop an optimizing compiler which performs special optimization techniques, suited for benchmark applications such as SPECint and SPECfp, can appear to have a more powerful computer. Conversely, the computer manufacturer who does not develop an optimizing compiler tailored to the benchmark suites used for the comparison can lose enormous sales and profit because the computer appears to execute applications or benchmarks more slowly.

Currently there is no simple method for computer manufacturers to determine if a competitor's hardware is more powerful or the benchmark has been highly optimized. Most computer manufacturers only disclose benchmarks compiled with the highest level of optimization. Outside of the benchmarks, this makes it very difficult to reliably compare the general performance characteristics of two computer hardware platforms. Even if a computer manufacturer was able to isolate specific optimization techniques used in the competitors benchmark, existing compilers could not include these optimization techniques without being significantly rewritten or redesigned. Rewriting an optimizing compiler for each benchmark is time consuming and not an economically efficient use of resources.

What is needed is a reliable technique which can analyze an executable generated for a source platform and generate a new executable for a target platform having a similar degree of optimization. This would be useful for determining the computing performance of different computer hardware platforms in a heterogeneous computing environment. It would also be useful in generating highly optimized executable benchmarks quickly and without re-writing the optimizer for a compiler.

SUMMARY OF THE INVENTION

According to the principles of the invention, a method and apparatus for transforming a source executable code optimized for a source processor into a target executable code optimized for execution on a target processor is provided. Initially, the source executable is converted into a functionally equivalent source executable capable of execution on the target processor. Next, execution performance information for each basic block of code in the functionally equivalent source executable code is collected. Similarly, execution performance information for each basic block of code in an initial target executable code is also collected. The initial target executable code is also capable of executing on a target processor. As a next step, an optimization metric is generated for each basic block of code within the functionally equivalent source executable code and for each basic block of code within the initial target executable code. These optimization metrics are used to compare basic blocks in the functionally equivalent source executable code with basic block of code within the initial target executable code. To perform this comparison, the optimization metric for each basic block of code within the initial target executable code is associated with the corresponding optimization metric associated with each basic block of code within the functionally equivalent source executable code. Typically, line numbers inserted from a symbolic debugger are used to associate the optimization metric and basic blocks within the initial target executable and the functionally equivalent source executable code. Next, based upon the corresponding optimization metric for each basic block, it is determined which basic blocks of code in the initial target executable code and the functionally equivalent source executable code have higher execution performance.

Next, a target executable code is generated using a combination of basic blocks of code from the initial target executable code and the functionally equivalent source executable code which exhibit higher execution performance. Then, each basic block in the target executable code is optimized in a predetermined order typically based upon the elapsed execution time.

The present invention provides several advantages previously unavailable in the art of compilers and optimizing compilers. First, the principles of the present invention eloquently combines optimization techniques found in multiple optimizing compilers without rewriting or modifying the optimizer in the compiler. Instead, the technique analyzes and selects basic blocks generated by one or more optimizing compilers based upon the execution performance of each basic block. Using a basic block level of granularity for this selection process enables the technique to use the most efficient optimization techniques offered from each different compiler. The optimization techniques are tailored to the benchmark and therefore improve execution performance.

This technique is also advantageous if a computer manufacturer wants to accurately compare their computer hardware platforms against the competitor's products. This can be useful before, during, and after the computer hardware platform is released. Before the computer hardware platform is released, this technique can be used to convert a competitors benchmark into an executable which can run on a newly designed hardware processor. Careful analysis can determine which areas of the newly designed hardware processor are efficient and which are not efficient when executing the benchmarking. This information can be used as part of an iterative design cycle to improve the processor design and ultimately improve performance. After the computer manufacturer creates the hardware, the present techniques can then be used to generate highly optimized benchmarks which use optimization techniques similar to the competitors.

The optimized benchmarks are also beneficial for the users because they can better gauge the performance characteristics of several computer systems. The users can take an optimized benchmark used on one computer system and port the actual benchmark to a target processor being considered for purchase. Using techniques of the present invention, the target benchmark will reflect similar optimization techniques and efficiencies as the source benchmark and will therefore provide a better basis of comparing the two platforms. This is an improvement from over the prior art where the users could not determine whether the performance was from highly optimized code or from the execution performance characteristics of the actual hardware. In the prior art, benchmarks were often a misleading and unreliable indicator of execution performance. The techniques of the present invention level the playing field by generating benchmarks and applications which are optimized to a similar level of optimization. As a result, users can rely on published benchmark results and statistics when selecting a computer hardware platform.

DETAILED DESCRIPTION

Figure 1:
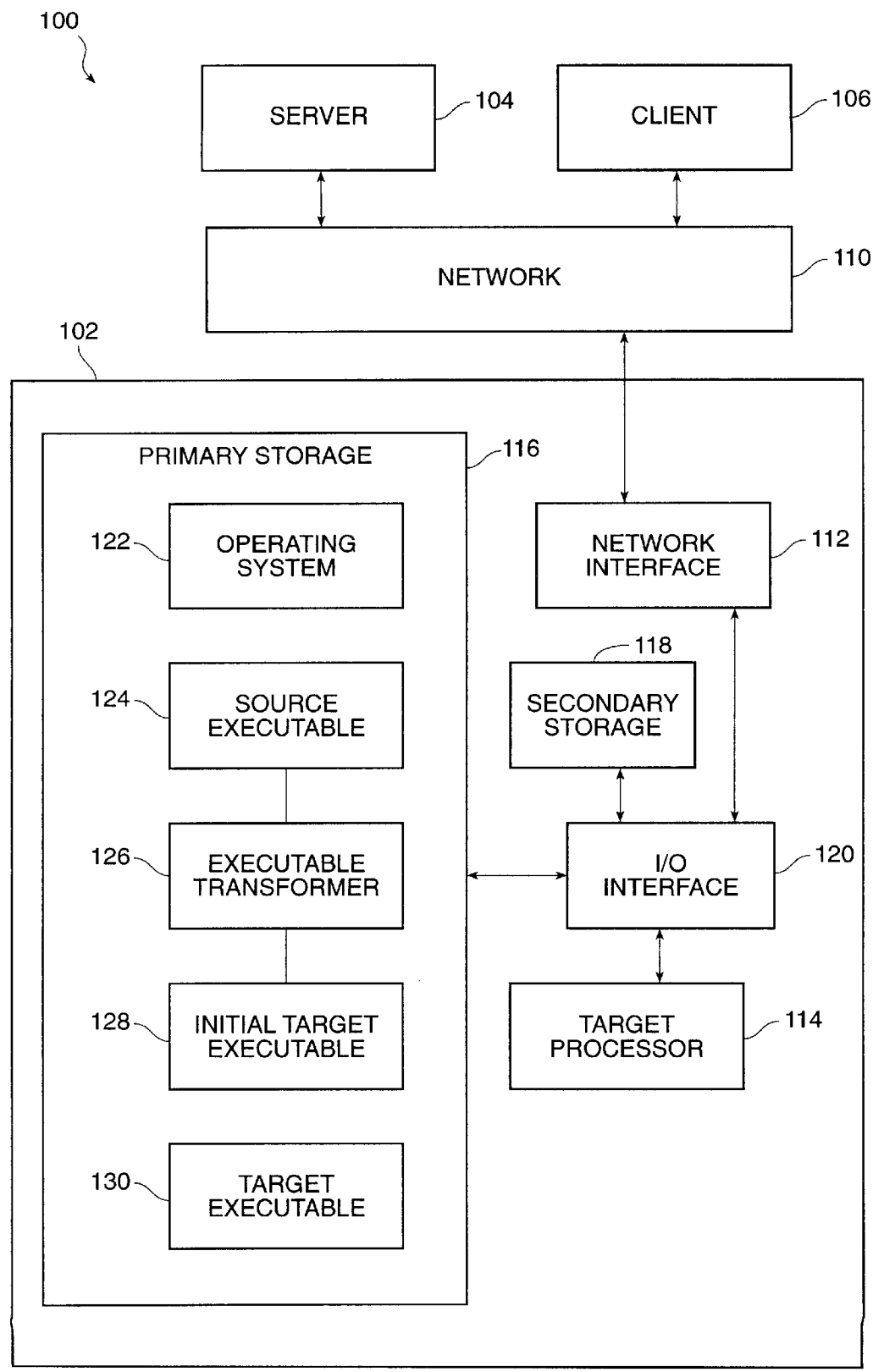
FIG. 1 illustrates a computer network for practicing one embodiment of the present invention.

FIG. 1 illustrates a computer network 100 for practicing one embodiment of the present invention. Computer network 100 includes server computer systems 102 and 104, also called servers 102 and 104 respectively, configured to communicate with a client computer system 106 over a network 110. In one embodiment, the client and server computer systems 102 and 104 coupled to this network transmit information utilizing the TCP/IP protocol. Other network protocols such as SNA, X.25, Novell Netware[1], Vines, or AppleTalk can also be used to provide similar client-server communication capabilities.

[1]. Netware is a registered trademark of Novell, Inc. in the United States and other countries.

Server 102 includes a network interface 112, a target processor 114, a primary storage 116, a secondary storage 118, and an I/O (input output) interface 120 which facilitates communication between these aforementioned elements. Network interface 112 couples server 102 to network 110 and facilitates communication between server 102 and other computers on the network.

Typically, target processor 114 on server 102 fetches computer instructions from primary storage 116 through I/O interface 120. After retrieving these instructions, target processor 114 executes these the computer instructions. Executing these computer instructions enables target processor 114 to retrieve data or write data to primary storage 116, secondary storage 118, display information on one or more computer display devices (not shown), receive command signals from one or more input devices (not shown), or retrieve data or write data to other computer systems coupled to network 110 such as server 104, and client 106. Those skilled in the art will also understand that primary storage 116 and secondary storage 118 can include any type of computer storage including, without limitation, randomly accessible memory (RAM), read-only-memory (ROM), application specific integrated circuits (ASIC) and storage devices which include magnetic and optical storage media such as CD-ROM. In one embodiment, target processor 114 can be any of the SPARC compatible processors, UltraSPARC compatible processors, or Java compatible processors available from Sun Microsystems, Inc. of Mountain View, Calif. Alternatively, target processor 114 can be based on the PowerPC processor available from Apple, Inc. of Cupertino, Calif., or any of the Pentium or x86 compatible processors available from the Intel Corporation or other corporations such as AMD, and Cyrix.

Primary storage 116 includes an operating system 122 for managing computer resources. In one embodiment, this operating system is the Solaris operating system or any operating system with support for object oriented programming languages such as the Java programming language or high level programming languages such as C. Also included in primary storage 116 is: a source executable 124 generated for execution on a source processor (not shown) using a conventional compiler; an executable transformer 126, designed in accordance with the present invention; an initial target executable 128 generated for execution on target processor 114 using a conventional compiler; and a target executable 130 generated by one embodiment of the present invention, such as executable transformer 126, using source executable 124 and initial target executable 128.

Figure 2:
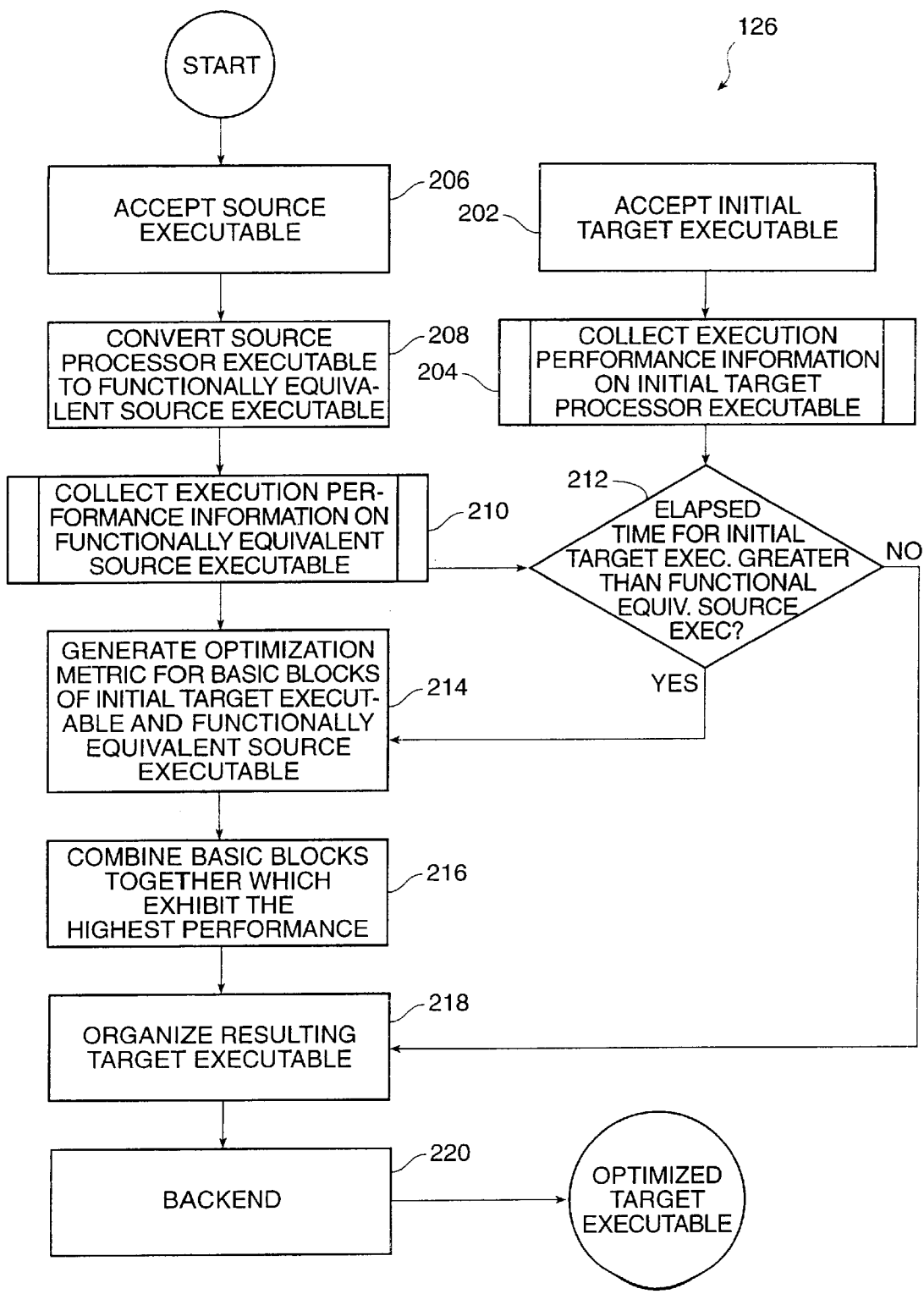
FIG. 2 is a flowchart illustrating the overall processing performed by one embodiment of the present invention used to transform a source executable into a target executable.

FIG. 2 is a flowchart illustrating the overall processing performed by one embodiment of executable transformer 126 used to transform source executable 124 (FIG. 1) optimized for a source processor into target executable 130 optimized for a target processor. Essentially, embodiments of the present invention combine the optimization techniques used by two or more compilers to generate a highly optimized target executable. To perform this task, this technique analyzes and optimizes portions from source executable 124 and portions from initial target executable 128 for use in the final target executable. The discussion below further details one embodiment of the present invention to achieve this task.

Initially, step 202 in FIG. 2 accepts initial target executable 128 (FIG. 1) for processing. Then at step 204 in FIG. 2, the technique collects execution performance information for each basic block of code in initial target executable code 128 (FIG. 1). Typically, this performance information includes elapsed time and the number of instructions used to execute each basic block within the executable. This performance information is used later to compare the execution efficiencies of initial target executable 128 (FIG. 1) with a functional equivalent target executable, derived from source executable 124. Further details on collecting the performance information is discussed below.

Next, the source executable is converted, according to principles of the invention, into a functionally equivalent source executable capable of execution on the target processor. Referring to FIG. 2, step 210 converts source executable 124 (FIG. 1) to a functionally equivalent source executable using one embodiment implemented in accordance with U.S. patent application Ser. No. 08/865,335 entitled "METHOD AND APPARATUS FOR CONVERTING EXECUTABLE COMPUTER PROGRAMS IN A HETEROGENEOUS COMPUTING ENVIRONMENT" naming Hari Ravichandran the inventor, herein incorporated by reference, assigned to the assignee of the present invention, and filed on even date herewith with Attorney docket No. 82225.P2132 which analyzes each instruction to be executed on the source processor and generates functionally equivalent instructions for execution on target processor 114. The resulting functionally equivalent source executable is capable of performing functionally equivalent operations and retains most optimizations generated by the conventional optimizing compiler used to generate the source executable because, in part, the execution order and data associated with the individual instructions are not significantly altered.

After the conversion is complete, processing transfers from step 208 to step 210 in FIG. 2. At step 210, performance information is collected on the functionally equivalent source executable to determine the execution performance when compared with initial target executable 124 (FIG. 1). To provide for a similar basis of comparison, this performance information also includes information such as elapsed time and the number of instructions used to execute each basic block within the executable. The additional details associated with collecting this performance information are discussed below.

In one embodiment, processing then transfers to determination step 212 in FIG. 2 where the technique determines if the functionally equivalent source executable should be used for optimizing initial target executable 124 (FIG. 1). Essentially, the functionally equivalent source executable will not be used for optimization purposes if it takes longer to execute the functionally equivalent source executable than initial target executable 124 (FIG. 1). Determination step 212 in FIG. 2 begins by comparing the sum of elapsed times associated with each basic block in the initial target executable and the sum of elapsed times associated with each basic block in the functionally equivalent source executable. If the comparison indicates the difference between elapsed times is less than a predetermined optimization threshold, the functionally equivalent source executable will not used for optimizing initial target executable 124 (FIG. 1) and processing transfers to step 218. Further details on step 218 are discussed below. Conversely, if the comparison indicates the difference between elapsed times is greater than or equal to a predetermined optimization threshold, the functionally equivalent source executable will be used for optimizing initial target executable 124 (FIG. 1) and processing transfers to step 214. For example, assume the predetermined threshold is 2 milliseconds, the functionally equivalent source executable takes 12 milliseconds and initial target executable takes 22 milliseconds to execute. In this case, the functionally equivalent source executable would be used to optimize the initial target executable because the difference in elapsed times, 10 milliseconds in this case, is greater than the threshold amount of 2 milliseconds.

In FIG. 2, step 214 generates an optimization metric for each basic block in the functionally equivalent source executable and initial target executable 124 (FIG. 1). In one embodiment, optimization metrics are generated in accordance with U.S. patent application Ser. No. 08/864,655 entitled "METHOD AND APPARATUS FOR DYNAMICALLY OPTIMIZING AN EXECUTABLE COMPUTER PROGRAM USING INPUT DATA" naming Hari Ravichandran the inventor, herein incorporated by reference, assigned to the assignee of the present invention, and filed on even date herewith with Attorney docket No. 82225.P2017 which includes information such as a basic block identifier, a frequency index associated with the basic block, live register and address register lists, code stability indicators, code state definition for most current run, cross block optimizer options, and an optimization metric value. These optimization metrics are used to provide a measure of execution performance for different basic blocks.

Referring to FIG. 2, step 214 uses the execution performance information collected in the previous steps and the optimization metrics to determine which basic blocks should be combined together to generate the target executable. Essentially, this step compares basic blocks in the functionally equivalent source executable against equivalent basic blocks in initial target executable 128 (FIG. 1). To perform this comparison, an association between basic blocks in the functionally equivalent source executable is made to corresponding basic blocks in initial target executable 128 (FIG. 1). There may be a one-to-one correspondence between basic blocks or a one to many correspondence between basic blocks depending on the way each executable was originally generated. In one embodiment, this correspondence is made by associating line numbers of the original source code with the associated basic blocks in the functionally equivalent source executable and initial target executable 128 (FIG. 1). For example, this can be done by compiling the functionally equivalent source executable and initial target executable 128 (FIG. 1) with a debug option that associates line numbers with basic blocks of code in each executable. These line numbers are used to match basic blocks from the functionally equivalent source executable with one or more basic blocks in initial target executable 128 (FIG. 1).

Next, the technique then determines which basic blocks of code in the initial target executable code and the functionally equivalent source executable code have higher execution performance based upon the corresponding optimization metric for each basic block. Details on determining execution performance for a basic block are discussed in U.S. patent application Ser. No. 08/864,655 entitled "METHOD AND APPARATUS FOR DYNAMICALLY OPTIMIZING AN EXECUTABLE COMPUTER PROGRAM USING INPUT DATA". If a basic block in initial target executable 128 (FIG. 1) performs better than the matching basic block in the functionally equivalent source executable, then the basic block in initial target executable 128 is used. Conversely, if a basic block in the functionally equivalent source executable performs better than the matching basic block in initial target executable 128 (FIG. 1), then the basic block in the functionally equivalent source executable is used. Combining basic blocks generated in this manner extracts the more effective optimization techniques generated by two different compilers and creates target executable 130 (FIG. 1) in accordance with principles of the present invention.

Step 218 in FIG. 2 performs an additional optimization on target executable 130 (FIG. 1) to improve execution performance. In one embodiment, step 218 iteratively processes each basic block in target executable 130 (FIG. 1) using actual input data in accordance with U.S. patent application Ser. No. 08/864,655 entitled "METHOD AND APPARATUS FOR DYNAMICALLY OPTIMIZING AN EXECUTABLE COMPUTER PROGRAM USING INPUT DATA". This embodiment typically provides higher performance because input data from the application or benchmark is utilized. Alternatively, static methods for optimizing target executable 130 (FIG. 1) well known in the art can be used which do not use actual input data to the benchmark or application. Referring to FIG. 2, at step 220 a backend process receives the optimized instructions from the optimizing step 216 and generates target executable 128 (FIG. 1), optimized for execution on target processor 114 (FIG. 1).

Figure 3:
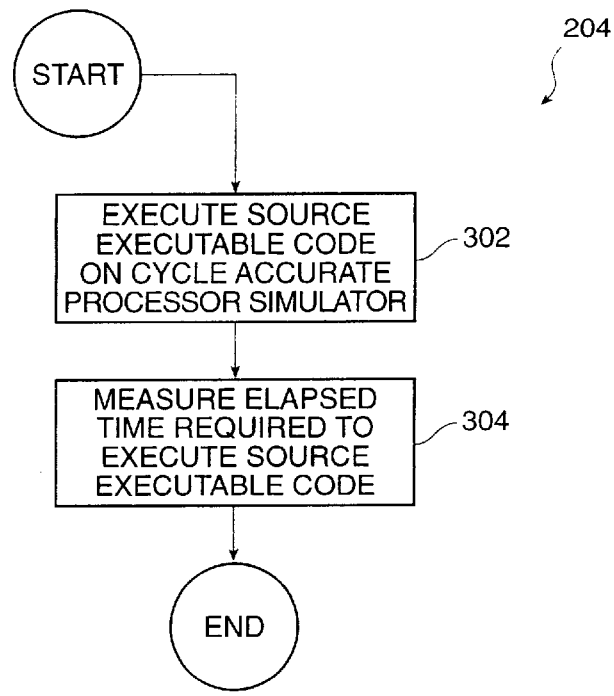
FIG. 3 is a flowchart illustrating the overall steps used for collecting performance information associated with the execution of source executable.

FIG. 3 is a flow chart illustrating the overall steps used for collecting performance information associated with the execution of source executable 124 (FIG. 1). In one embodiment, step 302 in FIG. 3 begins processing by executing source executable 124 (FIG. 1) on a cycle accurate simulator. The cycle accurate simulator allows one to produce reliable execution information associated with source executable 124 without having to actually use the source processor. This consolidates computing resources onto a single platform and reduces the cost of operating embodiments of the present invention. For more information on creating cycle accurate simulators see "Execution-Driven Simulation of a Superscalar Processor", authored by H. A. Rizvi, J. B. Sinclair, and J. R. Jump, Proceedings of the Twenty-Seventh Annual Hawaii IEEE International Conference on System Sciences, 1994. In another embodiment, an actual source processor can be used to execute source executable 124 (FIG. 1) rather than a cycle accurate simulator device. This latter approach can prove more expensive but has the benefit of processing embodiments of the present invention on multiple processors rather than a single target processor simulating the execution of source processor.

Next, step 304 in FIG. 3 is used to measure the elapsed time required to execute each basic block of code in source executable 124 (FIG. 1). Measuring elapsed times associated with each basic block of source executable 124 enables embodiments of the present invention to operate at a relatively fine level of granularity and thereby improve performance incrementally in a corresponding manner. The elapsed times collected at step 304 in FIG. 3 are used later by embodiments of the present invention to determine which basic blocks were more optimized and should eventually be used in target executable 130 (FIG. 1).

Figure 4:
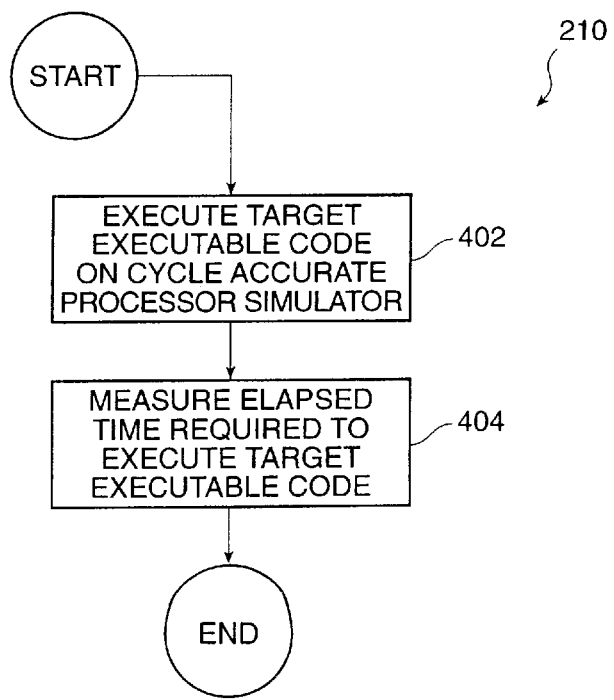
FIG. 4 is a flowchart illustrating the overall steps used for collecting performance information associated with the execution of initial target executable.

Referring to FIG. 4, a flow chart illustrates the overall steps used for collecting performance information associated with the execution of initial target executable 128 (FIG. 1). In one embodiment, step 402 in FIG. 4 begins processing by executing initial target executable 128 (FIG. 1) on a cycle accurate simulator. The cycle accurate simulator allows one to produce reliable execution information associated with source executable 124 without having to actually use target processor 114. This consolidates computing resources onto a single platform and reduces the cost of operating this embodiment of the present invention. For more information on creating cycle accurate simulators see "Execution-Driven Simulation of a Superscalar Processor" discussed above. In another embodiment, target processor 114 (FIG. 1) is used to execute initial target executable 128 rather than a cycle accurate simulator device.

Next, step 404 in FIG. 4 is used to measure the elapsed time required to execute each basic block of code in initial target executable 128 (FIG. 1). Measuring elapsed times associated with each basic block of initial target executable 128 enables embodiments of the present invention to operate at a relatively fine level of granularity and thereby improve performance incrementally in a corresponding manner. The elapsed times collected at step 404 in FIG. 4 are used later by embodiments of the present invention to determine which basic blocks are more optimized and should eventually be used in target executable 130 (FIG. 1).

The present invention provides several advantages previously unavailable in the art of compilers and optimizing compilers. First, the principles of the present invention eloquently combine optimization techniques found in multiple optimizing compilers without rewriting or modifying the optimizer in the compiler. Instead, the present invention analyzes and selects basic blocks generated by one or more optimizing compilers based upon the execution performance of each basic block. Using a basic block level of granularity for this selection process enables the technique to use the most efficient optimization techniques offered from each different compiler. The optimization techniques are tailored to the benchmark and therefore improve execution performance.

This technique is also advantageous if a computer manufacturer wants to accurately compare their computer hardware platforms against the competitor's products. This can be useful before, during, and after the computer hardware platform is released. Before the computer hardware platform is released, this technique can be used to convert a competitors benchmark into an executable which can run on a newly designed hardware processor. Careful analysis can determine which areas of the newly designed hardware processor are efficient and which are not efficient when executing the benchmarking. This information can be used as part of an iterative design cycle to improve the processor design and ultimately improve performance. After the computer manufacturer creates the hardware, the present techniques can then be used to generate highly optimized benchmarks which use optimization techniques similar to the competitors.

The optimized benchmarks are also beneficial for the users because they can better gauge the performance characteristics of several computer systems. The users can take an optimized benchmark used on one computer system and port the actual benchmark to a target processor being considered for purchase. Using techniques of the present invention, the target benchmark will reflect similar optimization techniques and efficiencies as the source benchmark and will therefore provides a better basis of comparing the two platforms. This is an improvement from the past where the users could not determine whether the performance was from highly optimized code or from the execution performance characteristics of the actual hardware. Prior art benchmarks are often a misleading and unreliable indicator of execution performance. The techniques of the present invention level the playing field by generating benchmarks and applications which are optimized to a similar level of optimization. As a result, users can rely on published benchmark results and statistics when selecting a computer hardware platform.

While specific embodiments have been described herein for purposes of illustration, various modifications may be made without departing from the spirit and scope of the invention. Those skilled in the art understand that the present invention can be implemented in a wide variety of compiler and interpreter technologies and is not limited to computer systems executing the compilers used for the SPARC architecture. Alternative embodiments substantially similar to the embodiments discussed above could be implemented except that the conversion techniques are adapted to work with Java Bytecodes for the Java Virtual Machine, executables for the Java line of processors such as the PicoJava, NanoJava, MicroJava, and UltraJava architectures or the PowerPC processor available from Apple, Inc. of Cupertino, Calif., or any of the Pentium or x86 compatible processors available from the Intel Corporation or other corporations such as AMD, and Cyrix. Accordingly, the invention is not limited to the above described embodiments, but instead is defined by the appended claims in light of their full scope of equivalents.

What is claimed is:

1. A method executed on a computer for transforming a source executable code optimized for execution on a source processor into a target executable code optimized for execution on a target processor, comprising the steps of:

converting the source executable code into a functionally equivalent source executable code capable of executing on the target processor;

collecting execution performance information for each basic block of code in the functionally equivalent source executable code;

collecting execution performance information for each basic block of code in an initial target executable code capable of executing on a target processor;

generating an optimization metric for each basic block of code within the functionally equivalent source executable code and for each basic block of code within the initial target executable code;

associating the optimization metric for each basic block of code within the initial target executable code with the corresponding optimization metric associated with each basic block of code within the functionally equivalent source executable code;

determining which basic blocks of code in the initial target executable code and the functionally equivalent source executable code have higher execution performance based upon the corresponding optimization metric for each basic block;

generating the target executable code using a combination of basic blocks of code from the initial target executable code and the functionally equivalent source executable code which exhibit higher execution performance; and optimizing each basic block in the target executable code in a predetermined order based upon the basic blocks which execute the most number of instructions.

2. The method in claim 1 wherein the step of collecting execution performance information for each basic block of code in the functionally equivalent source executable code further comprises the steps of:

executing the functionally equivalent source executable code for the target processor on a cycle accurate simulator designed to simulate the target processor; and measuring a first elapsed time for each basic block of code within the functionally equivalent source executable code.

3. The method in claim 2 wherein the step of collecting execution performance information for each basic block of code in the initial target executable code further comprises the steps of:

executing the initial target executable code for the target processor on a cycle accurate simulator designed to simulate the target processor; and measuring a second elapsed time for each basic block of code within the initial target executable code.

4. The method in claim 3, further comprising, subsequent to the step of generating an optimization metric, the steps of:

comparing the sum of the first elapsed times for each basic block of code associated with the source executable code and the sum of the second elapsed times for each basic block of code associated with the functionally equivalent source executable;

if the comparison indicates the difference between the sum of the first elapsed times and the second elapsed times is less than or equal to a predetermined optimization threshold, immediately performing the step of optimizing each basic block in the initial target executable code in a predetermined order; and if the comparison indicates the difference between the sum of the first elapsed times and the second elapsed times is greater than a predetermined optimization threshold, continuing processing by associating the optimization metric for each basic block of code.

5. The method in claim 1 wherein the step of associating the optimization metric for each basic block of code further comprises the steps of:

compiling the functionally equivalent source executable and the initial target executable such that each line of code in the original computer program corresponds to a basic block of code in the functionally equivalent source executable and the initial target executable; and matching basic blocks from the functionally equivalent source executable with one or more basic blocks in the initial target executable based upon each line of code common to both the initial target executable and the functionally equivalent source equitable.

6. The method in claim 1 wherein the predetermined order used in the dynamically optimizing step is generated comprising the step of:

ranking each basic block in the target executable code based upon which basic block in the target executable code performs the largest percentage of instructions compared with the total instructions executed in the target executable code.

7. An apparatus for transforming a source executable code optimized for execution on a source processor into a target executable code optimized for execution on a target processor, comprising:

a mechanism configured to convert the source executable code into a functionally equivalent source executable code capable of executing on the target processor;

a mechanism configured to collect execution performance information for each basic block of code in the functionally equivalent source executable code;

a mechanism configured to collect execution performance information for each basic block of code in an initial target executable code capable of executing on a target processor;

a mechanism configured to generate an optimization metric for each basic block of code within the functionally equivalent source executable code and for each basic block of code within the initial target executable code;

a mechanism configured to associate the optimization metric for each basic block of code within the initial target executable code with the corresponding optimization metric associated with each basic block of code within the functionally equivalent source executable code;

a mechanism configured to determine which basic blocks of code in the initial target executable code and the functionally equivalent source executable code have higher execution performance based upon the corresponding optimization metric for each basic block;

a mechanism configured to generate the target executable code using a combination of basic blocks of code from the initial target executable code and the functionally equivalent source executable code which exhibit higher execution performance; and a mechanism configured to optimize each basic block in the target executable code in a predetermined order based upon the basic blocks which execute the most number of instructions.

8. The apparatus in claim 7 wherein the mechanism configured to collect execution performance information for each basic block of code in the functionally equivalent source executable code further comprises:

a mechanism configured to execute the functionally equivalent source executable code for the target processor on a cycle accurate simulator designed to simulate the target processor; and a mechanism configured to measure a first elapsed time for each basic block of code within the functionally equivalent source executable code.

9. The apparatus in claim 8 wherein the mechanism configured to collect execution performance information for each basic block of code in the initial target executable code further comprises:

a mechanism configured to execute the initial target executable code for the target processor on a cycle accurate simulator designed to simulate the target processor; and a mechanism configured to measure a second elapsed time for each basic block of code within the initial target executable code.

10. The apparatus in claim 9 further comprising:

a mechanism configured to compare the sum of the first elapsed times for each basic block of code associated with the source executable code and the sum of the second elapsed times for each basic block of code associated with the functionally equivalent source executable; and a mechanism configured to perform the step of optimizing each basic block in the initial target executable code in a predetermined order if the mechanism configured to compare indicates that the difference between the sum of the first elapsed times and the second elapsed times is less than or equal to a predetermined optimization threshold.

* * * * *